United States Patent [19]

Mahadevan et al.

[11] Patent Number: 5,311,305
[45] Date of Patent: May 10, 1994

[54] TECHNIQUE FOR EDGE/CORNER DETECTION/TRACKING IN IMAGE FRAMES

[75] Inventors: Ramaswamy Mahadevan, Long Branch; Vishvjit S. Nalwa, Middletown, both of N.J.

[73] Assignee: AT&T Bell Laboratories, Murray Hill, N.J.

[21] Appl. No.: 906,916

[22] Filed: Jun. 30, 1992

[51] Int. Cl.⁵ .............................................. H04N 7/18
[52] U.S. Cl. .................................... 348/169; 348/208; 348/416
[58] Field of Search ........................ 358/105, 222, 125; H04N 7/18

[56] References Cited

U.S. PATENT DOCUMENTS

| | | | |
|---|---|---|---|
| 4,884,136 | 11/1989 | Ninomiya et al. | 358/105 |
| 5,018,218 | 5/1991 | Peregrim et al. | 382/30 |
| 5,053,876 | 10/1991 | Blissett et al. | 358/105 |
| 5,153,719 | 10/1992 | Ibenthal | 358/105 |

OTHER PUBLICATIONS

R. C. Bolles, H. H. Baker, and D. H. Marimont, "Epipolar-Plane Image Analysis: An Approach to Determining Structure from Motion," *International Journal of Computer Vision*, vol. 1, (1987), pp. 7-55.

*Primary Examiner*—Tommy P. Chin
*Assistant Examiner*—Richard Lee
*Attorney, Agent, or Firm*—Robert B. Levy

[57] ABSTRACT

Edges/corners in an image can be detected and tracked over time by first sampling the image at periodic time intervals, and then processing the samples to obtain the intensity value for each pixel within each image acquired at a particular time. For each pixel, the bidirectional intraframe correlation of its intensity with the intensities of pixels along each of several directions within the same image is computed. Also, the bidirectional interframe correlation of the intensity of each pixel in each image with the intensities of pixels along each of several directions spanning several images is established. The intraframe and interframe intensity correlations are processed to obtain spatiotemporal tangent information about isobrightness surfaces and curves which are indicative of edges and corners, respectively, and their image motions.

5 Claims, 3 Drawing Sheets

CONSTANT-INTENSITY REGION

ISOBRIGHTNESS SURFACE

SINGULAR CURVE

SPATIOTEMPORAL IMAGE OF INTENSITY CORNER

SPATIOTEMPORAL IMAGE OF INTENSITY T-JUNCTION

INTRA-FRAME
CORRELATION DIRECTIONS

1-PIXEL

1-PIXEL

INTER-FRAME
CORRELATION DIRECTIONS

TECHNIQUE FOR EDGE/CORNER DETECTION/TRACKING IN IMAGE FRAMES

TECHNICAL FIELD

This invention relates to a technique for detecting and tracking the edges/corners within successive images captured by a camera to enable the movement of the camera relative to objects within the images to be estimated.

BACKGROUND OF THE INVENTION

When processing the image captured by a television camera, knowledge of the motion of the edges and/or corners in the image is very useful as it facilitates the determination of the motion of the camera relative to objects in the image (up to a scale factor). Knowledge of the relative camera motion, defined as camera egomotion, is often useful for the purpose of image coding and/or image compression, and for computing the shape and three-dimensional position of objects in the image, up to the same scale factor mentioned earlier. The scale factor, which applies to both the size and depth of the object, is not determinable with a single camera. A knowledge of the location and shape of an object in an image is valuable, especially in robotics, for accomplishing autonomous navigation and manipulation.

The advent of digital technology, and especially digital image processing systems, has permitted the image of an object captured by a television camera to be sampled over both space (within the camera image plane) and time. Such spatiotemporal samples can be processed by the known techniques of intensity flow or edge flow, as described in greater detail below, to estimate the image velocity of visible object points. Calculation of the image velocity based on the intensity flow technique is predicated on the assumption that the spatiotemporal variation in the image intensity is continuously differentiable over time and space; and that for every visible point in space, its image intensity is time-invariant. Under these assumptions, the following expression can be derived for the component of the image velocity in the direction of the image intensity gradient.

$$v \cdot \frac{G}{||G||} = \frac{-\frac{\partial I}{\partial t}}{\sqrt{\left(\frac{\partial I}{\partial x}\right)^2 + \left(\frac{\partial I}{\partial y}\right)^2}} \quad (1)$$

It should be noted that Eq. (1) is not applicable to constant-intensity image regions, nor does it yield any information about the image velocity component perpendicular to the direction of the image intensity gradient. In other words, the equation provides no information about the image velocity component in a direction tangent to the isobrightness contour through the image point. This difficulty is known in the art as the intensity-flow aperture problem. As may be appreciated, the intensity flow technique estimates image velocity by the flow of image isobrightness contours which, in general, is different from that of the imaged scene points. The principal disadvantage of the intensity flow technique is that the assumption on which it is based, namely, the scene radiance is time-invariant in the direction of the camera, holds only for Lambertian surfaces with time-invariant irradiance.

Rather than estimate the image velocity based on the flow of isobrightness contours, the image velocity of visible scene points can be estimated based on the flow of the intensity edges within the image. The advantage of estimating image velocity in this manner is that the pre-image of each of the intensity edges, that is to say, their location in real space, is in general more likely to be invariant (with respect to the imaged objects in the scene) under motion of the camera relative to the scene and with respect to changes in the scene illumination, as compared to the pre-image of each isobrightness contour. The intensity flow and edge flow techniques are, in a sense, complimentary because the intensity flow technique depends upon continuity in the image intensity, whereas the edge flow technique is applicable precisely where continuity is lacking, at the edges and corners of objects in the image.

Estimating the image velocity by detecting the flow of edges and/or corners in a stack or collection of images in so-called spatiotemporal image space is preferable to detecting edges and/or corners in single frames and then matching them between frames. This may be understood by appreciating that the spatiotemporal image of a point is a coherent structure of one higher dimension, namely, a line. Similarly, the spatiotemporal image of a curve is a surface, and that of a surface, a volume. Detecting a line in three-dimensional space is easier than detecting a point in two-dimensional space, and detecting a surface in three dimensions is easier than detecting a line in two dimensions. In this context, while the image velocity of a scene point that maps onto a locally discernible spatiotemporal image curve can easily be determined by projecting the tangent to the curve onto the image plane, the image velocity of a scene point whose spatiotemporal image can only be restricted to some discernible surface, rather than to a curve, has a one-degree-of freedom local indeterminacy. This inherent limitation, known in the art as the edge-flow aperture problem, is analogous to the intensity-flow aperture problem discussed previously.

Thus, there is a need for a technique to determine and track the edges and/or corners in an image to determine their image velocities. This need is particularly great for tracking corners, which are not susceptible to the edge-flow aperture problem discussed earlier.

SUMMARY OF THE INVENTION

Briefly, in accordance with the invention, a technique is disclosed for detecting the evolution of the position of edges/corners within successive images captured by a camera to estimate the motion of the camera relative to objects in the images. The technique is initiated by periodically sampling the image of a camera at a lattice of image positions and then digitizing each sample. This provides the image intensity of each of a plurality of small picture elements (pixels) comprising each of the plurality of images captured at different times. Thereafter, a two-sided, (i.e., bidirectional) correlation of the intensity of each pixel with its neighboring pixels in a predetermined neighborhood within the same image and within a fixed number of preceding and succeeding images is computed. For ease of discussion, the intensity correlation of each pixel with others in the same image is referred to as the intraframe intensity correlation, while the intensity correlation of each pixel in an image with that in different images will be referred to as the interframe correlation. The bidirectional intraframe and interframe intensity correlations provide relatively robust tangent information related to isobrightness surfaces and curves in spatiotemporal image space, these being indicative of edges and corners, respectively, and their motion.

The intraframe and interframe correlations are utilized in the following manner to establish the presence of an edge/corner. Once the intraframe and interframe correlations are calculated, the maximum of each of the separate correlations is established. For ease of reference, the maximum interframe correlation is referred to as $\vec{\beta}_{max}$ and the maximum intraframe correlation is referred to as $\vec{\alpha}_{max}$. Knowing the maximum intraframe and interframe values is important because the bidirectional correlation is high along the direction of the spatiotemporal displacement of a corner, but low in all other directions. For a moving edge, the bidirectional correlation is high along the edge and along its direction of spatiotemporal displacement, but is low in directions orthogonal to the spatiotemporal plane defined by these two directions. Following calculation of $\vec{\beta}_{max}$, the maximum, $c_\perp$, from among the components of the interframe correlations orthogonal to $\vec{\beta}_{max}$ is established.

If $\vec{\beta}_{max}$ is truly associated with a corner, then $c_\perp$ should be much less than $\beta_{max}$. This is because the bidirectional correlation associated with a corner is high along its direction of spatiotemporal displacement and especially low in directions orthogonal to this displacement. By the same token, if there truly exists a corner, then $\beta_{max}$ should be significantly greater than $\alpha_{max}$. Thus, by computing the ratios $c_\perp/\beta_{max}$ and $\alpha_{max}/\beta_{max}$, and comparing each ratio to a threshold value, the presence of a corner can be detected. The motion of such a corner is tracked by tracking the direction of $\vec{\beta}_{max}$ over time.

Should a corner not be found (i.e., either of the ratios $c_\perp/\beta_{max}$ and $\alpha_{max}/\beta_{max}$ is greater than the threshold value), then the presence of an edge is checked. An edge is indicated by the existence of the following two conditions:

(1) the spatiotemporal correlation along the edge is high in comparison to that across the spatiotemporal surface swept by the moving edge; and (2) there is an inflection in the intensity across the spatiotemporal surface swept by the edge.

Let $e_\perp$ be the maximum from among the components of the interframe and intraframe correlations orthogonal to the spatiotemporal plane defined by $\vec{\alpha}_{max} \times \vec{\beta}_{max}$. Then, if $e_\perp$ is significantly less than $\alpha_{max}$ and there is an inflection in the intensity across the plane defined by $\vec{\alpha}_{max} \times \vec{\beta}_{max}$, then an edge is indicated. Should an edge be found, its motion can be tracked as lying within the spatiotemporal plane defined by $\vec{\alpha}_{max} \times \vec{\beta}_{max}$.

DETAILED DESCRIPTION

Figure 1:
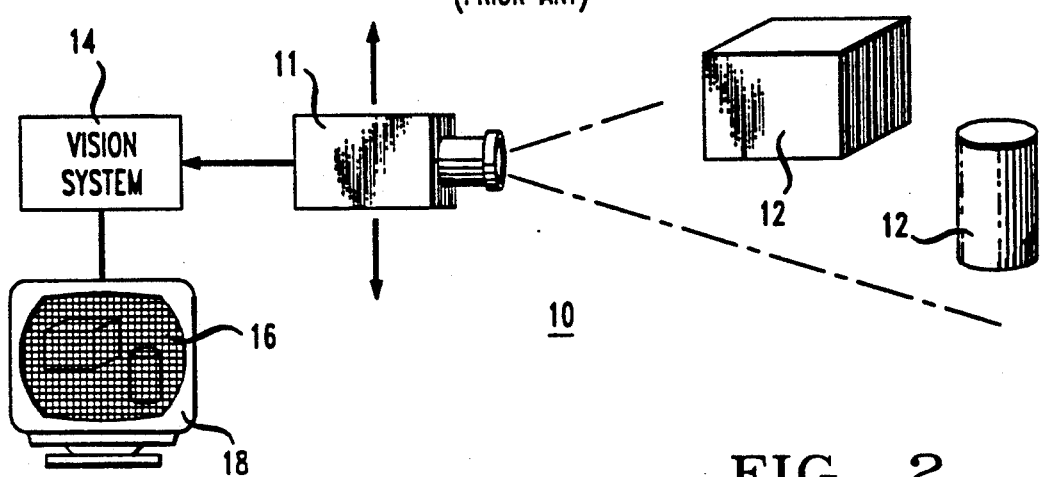
FIG. 1 is a block schematic view of a conventional image processing system according to the prior art.

Referring to FIG. 1, there is shown a conventional image processing system 10 comprising a television camera 11 which generates a video output signal indicative of the image of one or more objects 12 in a scene. As the camera 11 moves relative to the objects 12, its output signal changes, reflecting the changing relative position of the camera with respect to the scene. A machine vision processor 14, as is well known in the art, samples the output signal of the camera I 1 at periodic intervals over time and processes such samples, each sample representing the brightness at a particular image position at a particular time. The samples together establish a plurality of images captured at different times.

In operation, the vision system 14 converts the camera output signal into a stream of digital signals. Each digital signal in the stream is indicative of the intensity of a separate one of a plurality of small picture elements ("pixels") 16 which collectively comprise an image captured at a particular time, as displayed by a monitor 18 coupled to the vision system 14. By analyzing the pixel intensities, the vision system 14 can perform various analyses of each successively captured image to determine different attributes associated with the object(s) 12.

In the course of processing the sampled camera output signal, it is useful to know the motion of the camera I 1 relative to the objects 12 in the captured image (i.e., the camera egomotion). To determine the camera 11 egomotion, the edge and corner flow approach (wherein the flow of edges and corners in the captured images is used to estimate the image velocities of scene points) is employed as discussed earlier. Normally, the technique of estimating the image velocities by the flow of edges alone incurs the difficulty that the image velocity of a scene point, whose spatiotemporal image can only be determined to lie on some discriminable surface, has a one-degree-of- freedom indeterminacy. However, in accordance with the invention, this difficulty is overcome by tracking viewpoint-independent, locally discriminable image points (that is, certain types of corners) to establish the image velocity.

The tracking of locally discriminable image points is carried out by computing the spatiotemporal correlations between the pixel intensities within a sequence of successively captured images. The spatiotemporal correlation c (p,q) between the intensities I(p) and I(q) at spatiotemporal positions p and q, respectively, is defined to be:

$$c(p,q) \triangleq \frac{1}{1 + \frac{[I(p) - I(q)]^2}{k\sigma^2_{noise}}} \quad (2)$$

where k is a positive constant (e.g., 1) and $\sigma^2_{noise}$ is the variance of the intensity noise. Note that the larger the intensity difference, the smaller the correlation and and vice versa.

For tracking purposes, the manner in which the spatiotemporal intensity at a point p correlates with the intensities of its neighbors along a particular signed direction $\vec{d}$ or in an unsigned direction $\pm\vec{d}$ is of interest. The distinction between the signed and unsigned directions is that two vectors are said to have the same signed direction if their orientations coincide, and the same unsigned direction if their orientations coincide with at most a difference in sign. The signed directional intensity correlation $c_u(p,\vec{d})$ (referred to as the unidirectional intensity correlation) is given as follows:

$$\hat{c}_u(p,\hat{d}) \stackrel{\Delta}{=} \frac{1}{1 + \frac{\xi^2(p,\hat{d})}{k\sigma^2_{noise}}} \quad (3)$$

where $\xi^2$ is:

$$\xi^2(p,\hat{d}) = \frac{1}{N} \sum_{i=1}^{N} [I(p) - I(p + i\gamma\hat{d})]^2 \quad (4)$$

and k and N are positive constants, perhaps both 1. The unsigned directional intensity correlation $c_b(p,\pm\vec{d})$, (referred to as the bidirectional intensity correlation) is given as follows:

$$\hat{c}_b(p,\pm\hat{d}) \stackrel{\Delta}{=} \frac{1}{1 + \frac{\xi'^2(p,\pm\hat{d})}{k\sigma^2_{noise}}} \quad (5)$$

where $\xi'^2$ is $$\xi'^2(p,\pm\hat{d}) = \quad (6)$$

$$\frac{1}{2N} \sum_{i=1}^{N} \{[I(p) - I(p + i\gamma\hat{d})]^2 + [I(p) - I(p - i\gamma\hat{d})]^2\}$$

and k and N are positive constants, perhaps both 1. The terms $\xi^2$ and $\xi'^2$ are simply the mean-squared errors between the intensity at the point p and the intensities along the signed and unsigned directions, respectively. The parameter $\gamma$ measures the size of the steps along the signed and unsigned directions at which the data is sampled.

Figure 2:
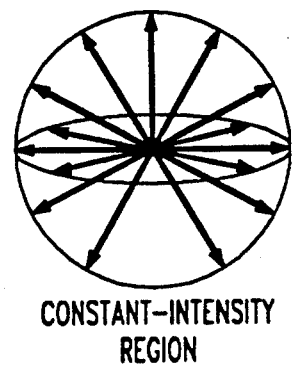
FIGS. 2, 3 and 4 each depict a plot of a separate one of three different unidirectional spatiotemporal intensity correlations, respectively, obtained by the system of FIG. 1.

To understand the value of knowing the unidirectional and bidirectional intensity correlations at point p, consider the resultant plots obtained by placing at p appropriately oriented vectors whose lengths are proportional to the magnitudes of the unidirectional and bidirectional intensity correlations at p. Each directional correlation vector, or vector-pair in the case of bidirectional correlations, points in the direction(s) in which the correlation is computed. It is important to note here that the magnitude of the largest correlation vector is normalized to have unit length. Referring now to FIG. 2, for the unidirectional intensity correlation, if the resultant vector plot is spherical, then it may be deduced that p lies within a region of constant intensity. In other words, the neighborhood of p is volume-wise coherent.

Figure 3:

Referring now to FIG. 3, for a unidirectional intensity correlation, if the vectors sweep out a surface (which in FIG. 3 is conical), then the swept-out surface is assumed to approximate an isobrightness surface across which the local intensity gradient is high. (Each ruling of the cone in FIG. 3 is a chord of the isobrightness surface, and as $\gamma$ in Eq. 4 goes to zero, these chords tend to become tangents and the cone of chords becomes a tangent plane.) The plot of FIG. 3 does not imply that the point p lies within the spatiotemporal image of an intensity edge. For this condition to be true, the intensity variation across the isobrightness surface must exhibit an inflection.

Figure 4:
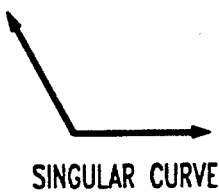

Referring to FIG. 4, if the plot of the unidirectional intensity correlation at the point p yields an angled line as shown in this figure, then point p lies along a singular curve along which the intensities are correlated, but across which they are not. It should be understood that the plot of FIG. 4 implies only a point object, not an intensity corner, a term used to indicate any locally discriminable image point.

Figure 5:
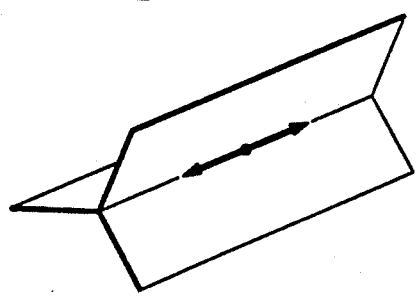
FIGS. 5 and 6 each depict a plot of a separate one of two bidirectional spatiotemporal intensity correlations, respectively, obtained by the image processing system of FIG. 1.
Figure 6:
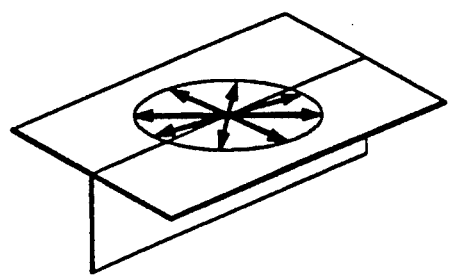

As compared to the unidirectional intensity correlation, the bidirectional intensity correlation, in general, provides more robust tangent information; however, the unidirectional correlation does provide curvature information which is sometimes useful. Referring to FIG. 5, there is shown a plot of the bidirectional intensity correlation for the condition where the point p lies along an intensity corner in each image. The plot shown in FIG. 5 is a straight line in spatiotemporal space. The bidirectional intensity correlation is high along the direction of the spatiotemporal displacement of a corner, but is low along all other directions. There is an exception for the correlated side of the top of a T-junction as illustrated in FIG. 6.

Figure 7:
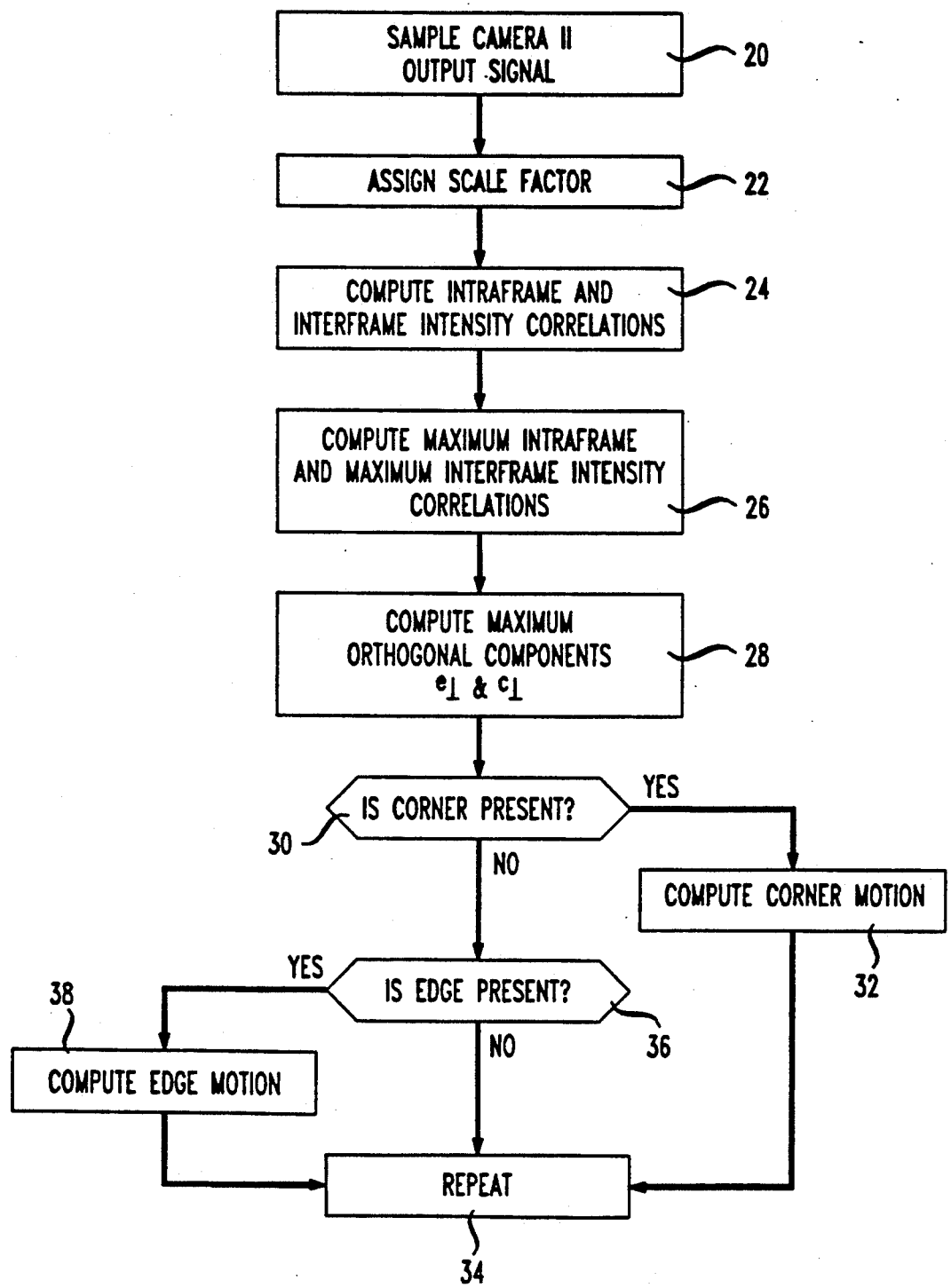
FIG. 7 is a flowchart representation of a method, in accordance with the invention, for establishing the existence and motion of an edge/corner in successive images captured by the image processing system of FIG. 1.

From a knowledge of the bidirectional intensity correlation of each pixel in an image to pixels in the same image, and to those in other images, the motion of edges and corners in the image can be tracked. Referring now to FIG. 7, there is shown, in flowchart form, a method in accordance with the invention for detecting the presence and image motion of edges and/or corners, from such bidirectional pixel intensity correlations. The method depicted in FIG. 7 is initiated by first repeatedly sampling the camera 11 output signal. Next a scale factor is assigned for the purpose of establishing the relative distances within a single image frame (i.e. the image captured by the camera 11 during the sampling interval) and between frames (step 22).

Following step 22, step 24 is executed and a bidirectional intraframe intensity correlation is computed for each pixel in a given frame in each of several directions in the frame. Also, during step 24, a bidirectional interframe intensity correlation is computed for each pixel in the given frame in each of several directions traversing the immediately preceding and succeeding frames. For ease of reference, the intraframe correlation will be designated by the term $\vec{\alpha}(p,\pm\vec{d})$ whereas the interframe correlation will be denoted by $\vec{\beta}(p,\pm\vec{d})$ where p is the spatiotemporal image position of the pixel at which the bidirectional correlation in the direction $\pm\vec{d}$ is computed. $\vec{\alpha}$ and $\vec{\beta}$ point along $\pm\vec{d}$.

Figure 8:
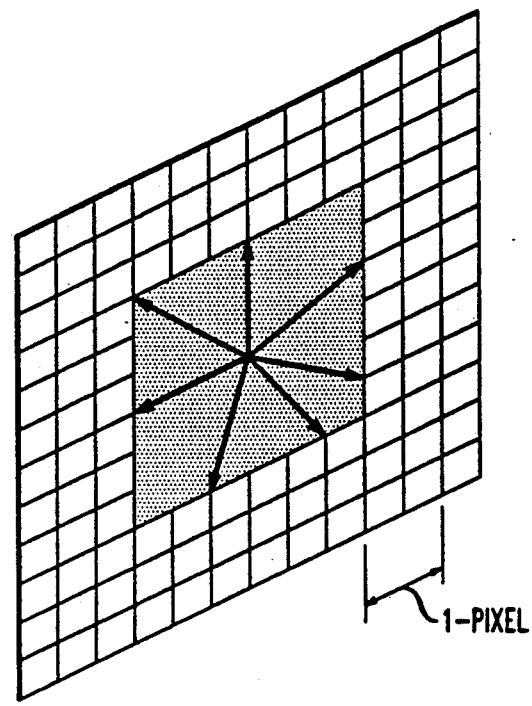
FIG. 8 is a graphical plot showing the directions in which the intensity correlations are computed within a single image during the method of FIG. 7.
Figure 9:
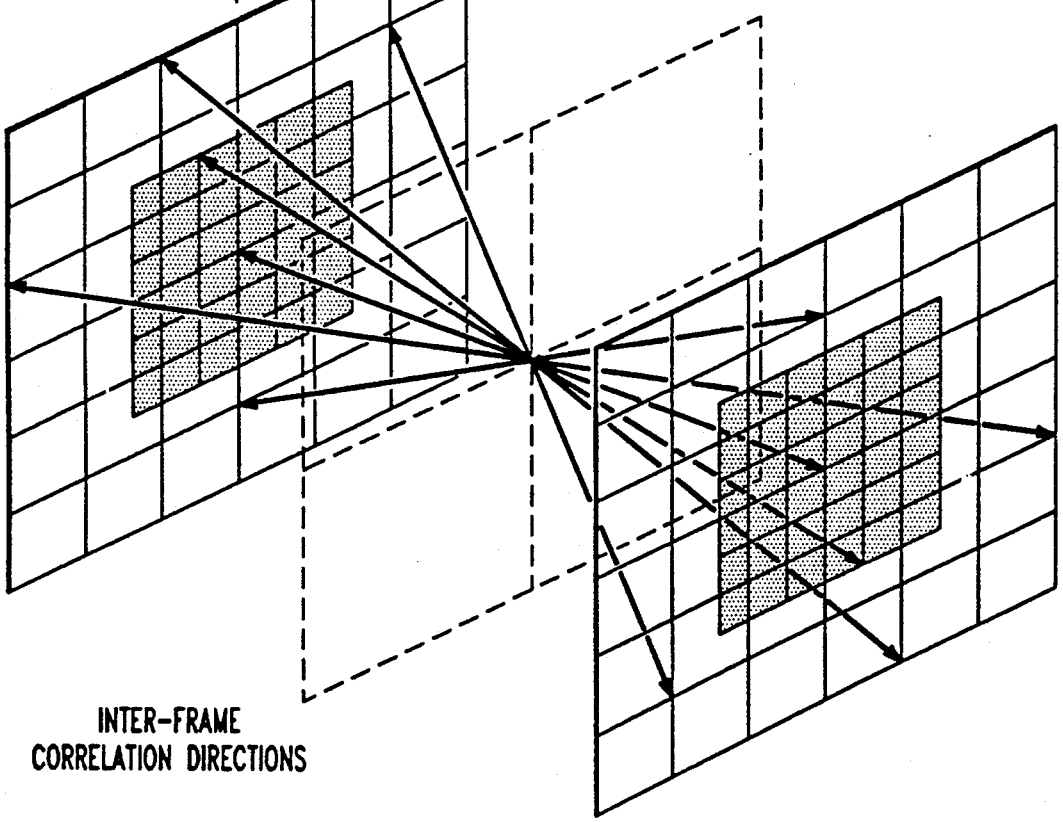
FIG. 9 is a graphical plot showing the directions in which the intensity correlations are computed across a plurality of images during the method of FIG. 7.

Owing to the nature of the imaging process, the pixels within each image frame are generally correlated. This correlation makes it possible to obtain sub-pixel accuracy by interpolating each image frame into a new grid as best seen in FIG. 8, which has twice the resolution of the original grid. In other words, each pixel 16 of FIG. 1 constitutes four squares in the grid shown in FIG. 8. For ease of computation, the intraframe intensity correlation for each pixel in the interpolated grid is computed during step 24 in the direction of each of its neighbors lying at the boundary of a 3×3 pixel window as shown in FIG. 8. Referring to FIG. 9, the interframe correlation for each pixel in a given interpolated frame is computed in the direction of each pixel lying in a corresponding window in each of the adjoining frames. It is worth noting here that though FIGS. 8 and 9 show just the two nearest neighbors of the central pixel along any direction, the bidirectional correlation computation may involve any multiple of two neighbors of the central pixel along every direction.

Following step 24 in FIG. 7, the maximum of the interframe and the maximum of the intraframe correlations are established (step 26). For ease of reference, the maxima of the intraframe and interframe correlations are designated $\vec{\alpha}_{max}$ and $\vec{\beta}_{max}$, respectively. After step 26, step 28 is executed and the maximum intensity correlation component, of the various $\vec{\alpha}(p,\pm d)$, and $\vec{\beta}(p,\pm d)$, orthogonal to the plane defined by $\vec{\alpha}(p,\pm d) \times \vec{\beta}(p,\pm d)$ is selected. For ease of reference, this value will be referred to as $e_\perp$. Also during step 28, the maximum is selected from among the components of the interframe intensity correlations $\vec{\beta}(p, \pm d)$ orthogonal to $\vec{\beta}_{max}$. This value will be referred to as $c_\perp$.

Next, step 30 is executed and a determination is made whether a corner is present in the image. As discussed earlier, when plotted, the bidirectional correlation of a corner in spatiotemporal space is high in the direction of movement of the corner, but low in all other directions. Therefore, $c_\perp$, which represents the maximum interframe correlation component orthogonal to $\vec{\beta}_{max}$ should be small as compared to $\beta_{max}$ when $\vec{\beta}_{max}$ is associated with a corner. Since the bidirectional correlation of the intensity of a corner is expected to␣be low in all directions except its direction of movement, ($\alpha_{max}$ should also␣be much less than when $\beta_{max}$ when the latter is associated with a corner. To detect whether a corner is present, the ratios $c_\perp/\beta b_{max}$ and $\alpha_{max}/\beta_{max}$ are computed during step 30 and compared to a predetermined threshold T. If $c_\perp/\beta_{max}$ and $\alpha_{max}/\beta_{max}$ are each less than T, then a corner is present in the sampled images. Having established that a corner is present, then step 32 is executed, and the motion of the corner is tracked by tracking $\vec{\beta}_{max}$ over time. After computation of the corner motion, the entire process is repeated (step 34).

Should no corner be found during step 30 (i.e., one or both of the ratios $c_\perp/\beta_{max}$ and $\alpha_{max}/\beta_{max}$ is found to exceed T), then during step 36, a check is made whether an edge is present. As discussed earlier, the spatiotemporal correlation is high along an edge but low across the edge. However, this alone is not truly determinative of an edge. If an edge is present, then the intensity must exhibit an inflection across the spatiotemporal surface swept by the edge as well. The presence of an edge is revealed during step 36 by the existence of the following three conditions:

1) either of the ratios $c_\perp/\beta_{max}$ or $\alpha_{max}/\beta_{max}$ exceeds T (as checked during step 30);
2) the ratio $e_\perp/\alpha_{max}$ is less than T; and
3) there is an inflection in the intensity orthogonal to the plane defined by $\vec{\alpha}_{max} \times \vec{\beta}_{max}$.

Thus, during step 36, given that one of the ratios $c_\perp/\beta_{max}$ or $\alpha_{max}/\beta_{max}$ was found to exceed T during step 30, the ratio $e_\perp/\alpha_{max}$ is checked to determine if this ratio is less than T, and in addition an inflection in the intensity across the plane of $\vec{\alpha}_{max} \times \vec{\beta}_{max}$ is sought in order to detect the presence of an edge.

If an edge is detected during step 36, step 38 is executed and the edge motion is established by tracking the plane $\vec{\alpha}_{max} \times \vec{\beta}_{max}$ over time. After step 38 the entire process is repeated (step 34).

It is entirely possible that neither an edge nor a corner will be present at a particular location in the sampled image at a particular time. At any rate, step 34 is executed, and the process is continually repeated at each pixel at every time interval.

The foregoing discloses a technique for detecting the presence of edges/corners in successive images captured by a camera 11 in accordance with the bidirectional intensity correlations of the pixels within such images, and for tracking the image motions of the detected edges/corners.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for detecting and tracking edges/corners in an image captured by a camera comprising the steps of, periodically sampling the image at regular time intervals;

processing each sampled image to establish an intensity for each of a plurality of individual picture elements (pixels) collectively comprising said sampled image;

computing an intraframe bidirectional correlation of the intensity of each pixel in each said sampled image with each of the pixels within a predetermined neighborhood in said image to detect line and surface singularities in spatiotemporal space;

computing an interframe bidirectional correlation of the intensity of each pixel in said each sampled image with each of the pixels in a predetermined neighborhood in each of other sampled images to detect line and surface singularities in spatiotemporal space and the movement of said line and surface singularities; and determining, from said interframe and intraframe bidirectional correlations, the presence of an edge/corner in each sampled image and its motion over time.

2. The method according to claim 1 wherein a corner is determined by:

computing a maximum $\vec{\beta}_{max}$ from among interframe intensity correlations;

computing a maximum $c_\perp$ from among interframe intensity correlation components that are orthogonal to a maximum interframe intensity correlation;

computing a maximum $\vec{\alpha}_{max}$ from among intraframe intensity correlations;

comparing both of a pair of ratios $c_\perp/\beta_{max}$ and $\alpha_{max}/\beta_{max}$ to a predetermined threshold; and establishing the presence of a corner when both ratios $c_\perp/\beta_{max}$ and $\alpha_{max}/\beta_{max}$ are less than a predetermined threshold.

3. The method according to claim 2 wherein a corner is determined by:

comparing said ratios $c_\perp/\beta_{max}$ and $\alpha_{max}/\beta_{max}$ to a predetermined threshold;

computing a maximum $e_\perp$ from among each interframe and intraframe intensity correlation component that lies along a cross product of a maximum intraframe intensity correlation with a maximum interframe intensity correlation;

comparing ratio $e_\perp/\alpha_{max}$ to a predetermined threshold;

detecting whether there exists an inflection in pixel intensities in a direction orthogonal to a plane defined by $\vec{\alpha}_{max}$ and $\vec{\beta}_{max}$; and establishing the presence of an edge when:

(a) at least one of the ratios $c_\perp/\beta_{max}$ and $\alpha_{max}/\beta_{max}$ exceeds a predetermined threshold;

(b) the ratio $e_\perp/\alpha_{max}$ is less than a predetermined threshold; and (c) there is an inflection in pixel intensities in a direction orthogonal to the plane defined by $\vec{\alpha}_{max} \times \vec{\beta}_{max}$.

4. The method according to claim 2 wherein the motion of a corner is established by evolution of $\vec{\beta}_{max}$ over time.

5. The method according to claim 2 wherein the motion of an edge is established by evolution of $(\vec{\alpha}_{max} \times \vec{\beta}_{max})$ over time.

* * * * *